UNITED STATES PATENT OFFICE.

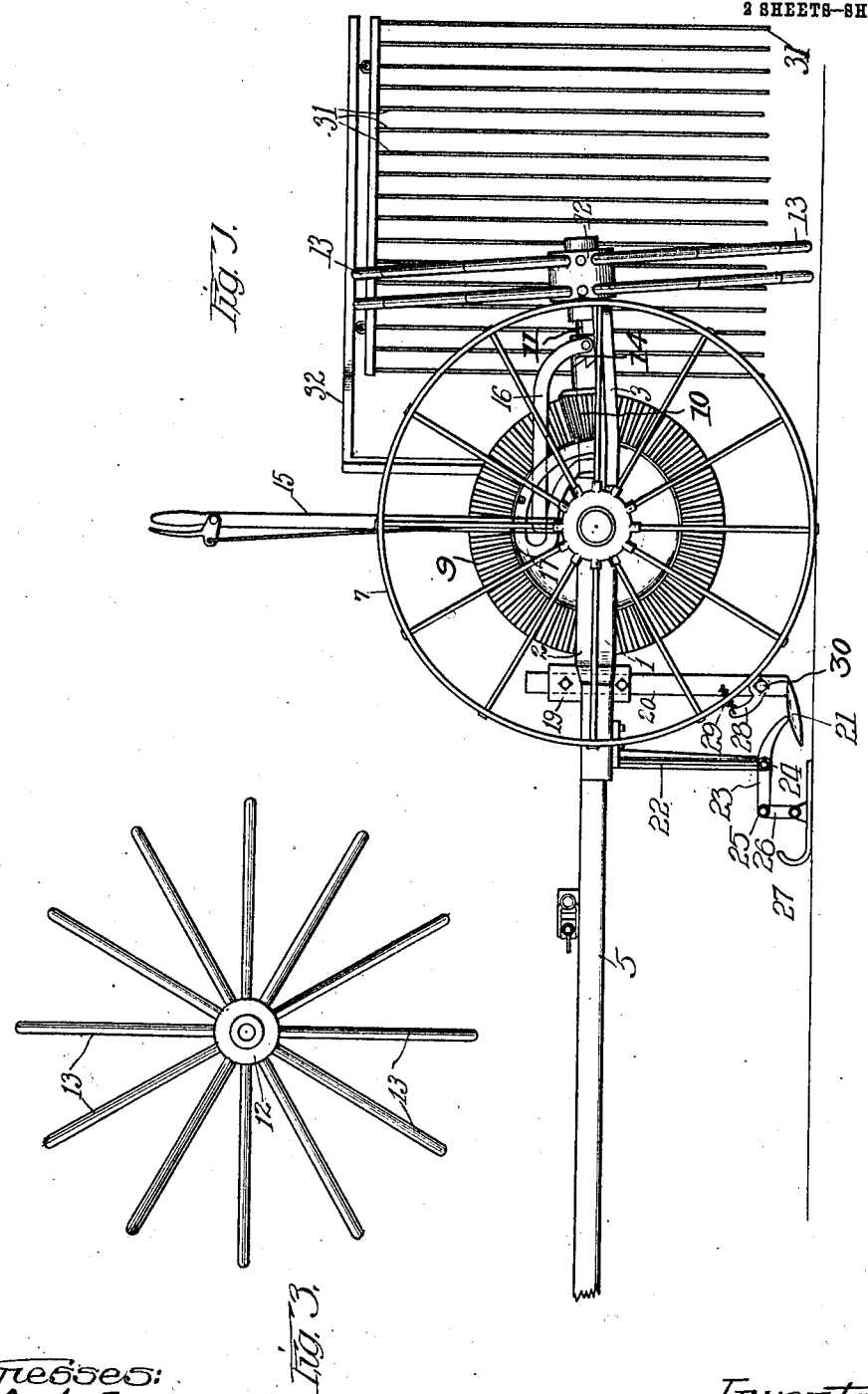

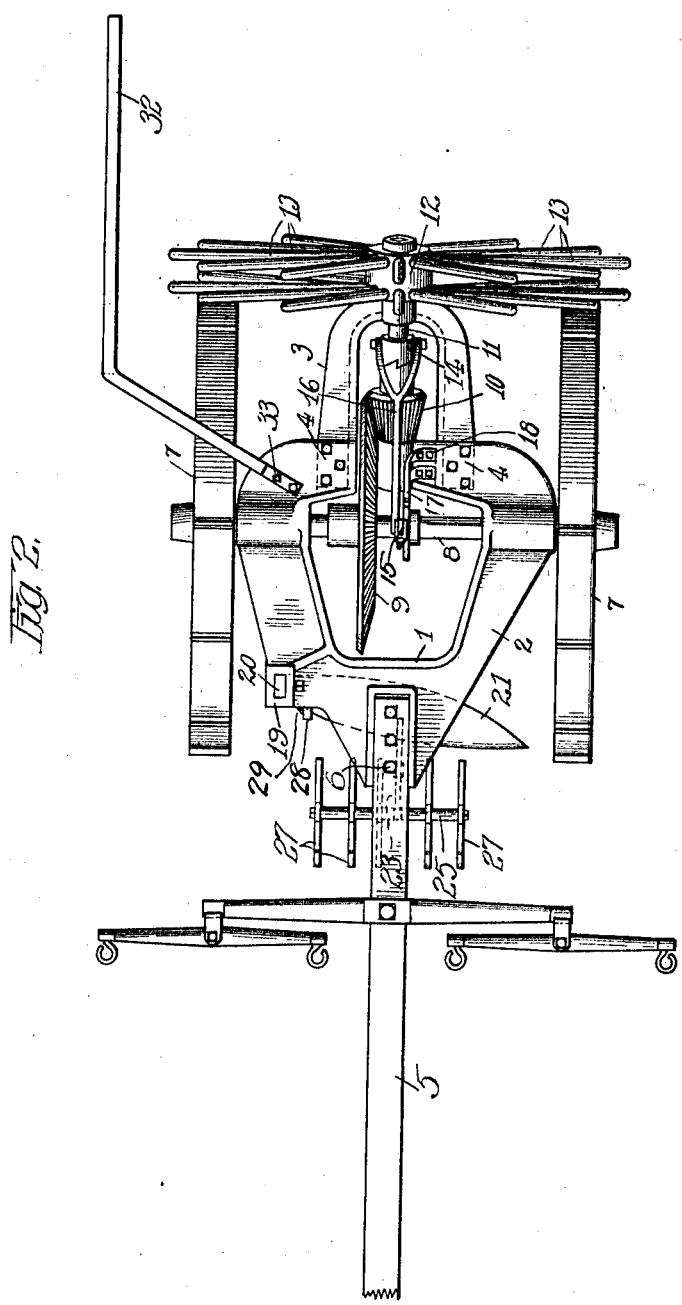

ANDREW LANDIN, OF ST. PAUL, MINNESOTA.

POTATO-DIGGER.

1,004,041.  Specification of Letters Patent.  Patented Sept. 26, 1911.

Application filed February 3, 1911. Serial No. 606,339.

*To all whom it may concern:*

Be it known that I, ANDREW LANDIN, a citizen of Sweden, residing at St. Paul, in the county of Ramsey, in the State of Minnesota, have invented certain new and useful Improvements in Potato-Diggers, of which the following is a specification.

This invention relates to potato diggers in which the potatoes are dug by a plurality of arms rotating in a plane transverse to the direction of the movement of the digger. Its object is to simplify the operation of the device.

Another object is to provide means for thoroughly plowing the ground so that the potatoes may be very well separated from any undesirable or foreign matter before the digging mechanism operates upon them.

With the foregoing and other objects in view the invention consists in the combination and arrangement of parts to be hereinafter fully described in the following specification, pointed out in the claims and illustrated in the accompanying drawings which form a part of said specification and in which—

Figure 1 is a side elevation of my potato digger. Fig. 2 is a plan of the same. Fig. 3 is an end view of the digging arms.

Like reference characters indicate corresponding parts throughout the several views.

1 is the frame of my improved potato digger which is preferably made in two parts, 2 and 3 which are suitably fastened together as at 4.

5 is the draft pole which is fastened to the forward end of the part 2 of the frame at 6. The main portion 2 of the frame is supported from the driving wheels 7 by means of the axle 8. Upon the axle is secured the operating gear 9 which rotates therewith and which is engaged by the pinion 10 secured upon a longitudinal shaft 11 which is journaled in the main frame 2. This shaft 11 extends lengthwise of and beyond the part 3 of the frame and upon its rear extremity are mounted the digging means which comprise a hub 12 and radially disposed digging arms 13, the said hub revolving with the shaft. The pinion 10 is thrown in and out of gear through the medium of a clutch mechanism 14 operated by a lever 15 having connection therewith through a link 16.

17 is a rack having notches therein by means of which the lever 15 may be locked in such position that the clutch 14 is secured in operative or in inoperative position as desired. The rack 17 is suitably fastened to the main frame 2 at 18.

Toward the front of the main part 2 of the frame is secured an upright hollow standard 19 in which an arm 20 is fixed. This arm is vertically disposed and carries at its lower termination a bent arm 28 pivoted as at 30 to the arm 20 and to the lower termination of the arm 28 the shovel or scoop 21 is secured.

29 is a spring having one extremity secured to the bent arm 28 and the other extremity fixed to the arm 20.

22 is a vertical beam suitably secured to the front end of the main part 2 of the frame and provided at its lower extremity with a trip arm 23 pivotally carried as at 24, the free extremity of which is adapted to rest normally upon the shovel 21 while the opposite end carries a transverse rod 25 to which are secured a plurality of links 26 each of which carries a suitable shoe 27 at its lower termination.

In operation when the shoe 27 comes in contact with a hill of potatoes it rides upon the same thus raising the adjacent end of the tilting arm 23 and depressing the opposite extremity of said arm which is in contact with the shovel 21 and which operation tilts the shovel to the ground rotating the arm 28 on its pivot 30 and extending the spring 29. When pressure is removed from the shovel the spring 29 will bring the same back to its normal position. The great advantage of this arrangement is apparent to any practical farmer who realizes that the shovel or scoop in the ordinary potato digger too often fails in its purpose of loosening the dirt and foreign matter from about the potatoes through the fact that it is carried at such an elevation above the same as to pass entirely over them without contact. If the shovel or scoop is carried normally in a position near enough to the ground it is subject to injury through contact with rocks and foreign matter generally when not directly over a potato hill. After contact with the shoes and shovel referred to the potatoes are next brought in contact with the digging arms 13 which revolve as previously described and by which they are hurled against a fence 31 carried by an arm 32 that is fastened to the frame 2 at 33 from which they drop to the ground and are ready to be gathered.

What I claim is:—

1. In a potato digger, the combination with the main frame provided with a supporting axle having a driving gear mounted thereon, a longitudinal shaft journaled in said frame and actuated by said driving gear, rotary digging mechanism secured upon said longitudinal shaft and operating in a plane at right angles thereto; of an arm depending from said frame, a shovel pivotally carried by said arm and means secured to said frame in advance of said shovel for tilting the same.

2. In a potato digger, the combination with the main frame provided with a supporting axle having a driving gear mounted thereon, a longitudinal shaft journaled in said frame and actuated by said driving gear, rotary digging mechanism secured upon said longitudinal shaft and operating in a plane at right angles thereto; of an arm depending from said frame, a shovel pivotally carried by said arm, a beam secured to said frame, a trip arm secured to said beam having one extremity resting normally on the said shovel, a transverse rod carried at the opposite end of said trip arm and a plurality of shoes arranged on said transverse rod.

In testimony that I claim the foregoing as my own I have hereto affixed my signature in the presence of two subscribing witnesses.

ANDREW LANDIN.

Witnesses:
CARL O. OLSON,
N. O. HOGE.

---

Copies of this patent may be obtained for five cents each, by addressing the "Commissioner of Patents, Washington, D. C."